Patented May 3, 1938

2,116,347

UNITED STATES PATENT OFFICE 2,116,347

ALPHA-SALICYLO-ALIPHATIC ACID ESTERS

Ernest F. Grether and Russell B. Du Vall, Midland, Mich., assignors to The Dow Chemical Company, Midland, Mich., a corporation of Michigan No Drawing. Application August 25, 1937, Serial No. 160,888

7 Claims. (Cl. 260—104)

The present invention relates to an improved method of making alpha-salicylo-aliphatic acid esters having the general formula:—

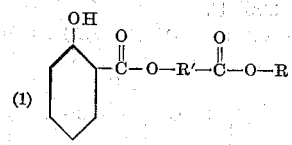
(1)

wherein R and R' are alkyl radicals. It also concerns certain new esters, having the general formula:—

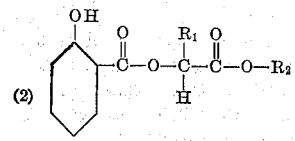
(2)

wherein $R_1$ and $R_2$ represent alkyl radicals, which may be prepared by our method.

Senff, Ann. 208, 272 (1881) has disclosed that an ester of salicylo-acetic acid may be prepared by heating sodium salicylate with an ester of chloro-acetic acid, the reaction involved being represented by the equation:—

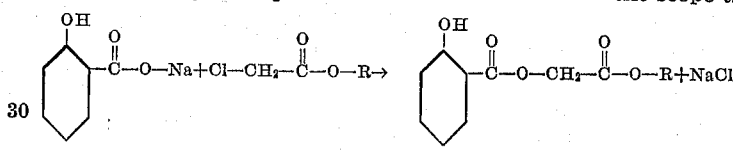

wherein R is an alkyl group. The yield of salicylo-acetic acid ester by this method is always low and the method has the further disadvantage that it cannot satisfactorily be applied in making the corresponding esters of higher aliphatic acids. For instance, when attempt is made to prepare an ester of salicylo-propionic acid by heating sodium salicylate with an ester of alpha-chloro-propionic acid in accordance with the procedure taught by Senff, the desired ester product, if formed at all, is obtained in such small yield that its separation and purification cannot successfully be accomplished.

We have now found that the salicylo-aliphatic acid esters having the general formula (1) hereinbefore presented may readily be prepared in excellent yield by reacting an alkali-metal salicylate with an alpha-bromo-aliphatic acid ester. By this improved method we have prepared certain new ester products having the foregoing general formula (2). These new esters are particularly useful as unguents and analgesics for external use in the treatment of rheumatism and related ailments. They are also useful as plasticizers for synthetic resins, particularly polystyrene and other polymerized vinyl compounds.

The invention, then, consists in the improved method and new products hereinafter fully described and particularly pointed out in the claims.

Although widely varying proportions of reactants may be employed in preparing alpha-salicylo-aliphatic acid esters, in practice we prefer to use approximately equimolecular proportions of an alpha-bromo-aliphatic acid ester and an alkali-metal salicylate, e. g. sodium salicylate, potassium salicylate, etc. The ester and the salicylate are mixed and heated, preferably at a temperature between about 125° C. and about 200° C. and at atmospheric pressure for a period of 15 to 40 hours, depending upon the particular reactants employed. The alkali-metal salicylate may all be present in the initial reaction mixture, or it may be added from time to time during the heating period. When the reaction is completed, the mixture is cooled, washed with water, and extracted with benzene. The benzene extract is then dried and fractionally distilled to separate the desired product.

The following examples illustrate certain ways in which the principle of the invention has been employed, but are not to be construed as limiting the scope thereof:

Example 1

A mixture of 452.5 grams of ethyl-alpha-bromo-propionate (boiling point 159°–161° C.) and 300 grams of sodium salicylate was heated at a temperature of 180° C. for 14 hours. 100 grams of additional sodium salicylate was then added and the mixture heated at 180° C. for an additional 12 hours. The crude product was then cooled, washed with water, and extracted with benzene. The benzene extract was dried and fractionally distilled, the fraction distilling at temperatures between 142° C. and 149° C. at 5 millimeters pressure being collected. This fraction consisted of 532 grams of alpha-salicylo-ethyl-propionate, a colorless liquid having a slightly sweet odor, and having the formula:—

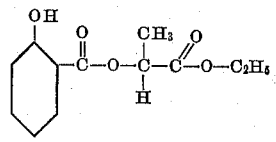

Example 2

A mixture of 390 grams of ethyl-alpha-brombutyrate (boiling point 80°–84° C. at 28 millimeters absolute pressure) and 220 grams of sodium salicylate was heated at a temperature of 180° C. for 10 hours. 100 grams of sodium salicylate was added and the mixture was further heated at 180° C. for 10 hours. The crude reaction product was then washed with water and extracted with benzene. The benzene extract was fractionally distilled, the fraction boiling at temperatures between 147° to 155° C. at 4 millimeters absolute pressure, being collected. This fraction consisted of 420 grams of alpha-salicylo-ethyl-n-butyrate, a colorless, practically odorless liquid, having the formula:—

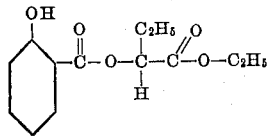

Other new salicylates having the hereinbefore presented general formula (2), e. g. alpha-salicylo-methyl iso-caproate, alpha-salicylo-butyl oenanthate, alpha-salicylo-ethyl caprylate, etc., may be prepared by the method illustrated in the foregoing detailed examples. Such compounds are in most instances high-boiling liquids and are useful in pharmaceutical preparations and as plasticizers for synthetic resins.

Other modes of applying the principle of our invention may be utilized in addition to those hereinbefore described, change being made as regards the method or products employed, provided the steps or products stated by any of the following claims or the equivalent of such stated steps or products be employed.

We therefore particularly point out and distinctly claim as our invention:—

1. The method of preparing alpha-salicylo-aliphatic acid esters which comprises reacting an alpha-bromo-aliphatic acid ester with an alkali-metal salicylate.

2. The method of preparing alpha-salicylo-aliphatic acid esters which comprises heating a mixture of an alpha-bromo-aliphatic acid ester and an alkali-metal salicylate at a temperature between about 125° C. and about 200° C.

3. The method of preparing alpha-salicylo-ethyl propionate which comprises heating a mixture of ethyl alpha-bromo-propionate and sodium salicylate at a temperature between about 125° C. and about 200° C.

4. The method of preparing alpha-salicylo-ethyl-n-butyrate which comprises heating a mixture of ethyl alpha-bromo-butyrate and sodium salicylate at a temperature between about 125° C. and about 200° C.

5. An ester having the general formula

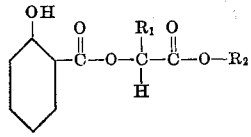

wherein $R_1$ and $R_2$ each represents an alkyl radical.

6. Alpha-salicylo-ethyl propionate, a colorless liquid boiling at a temperature of about 142°–149° C. at 5 millimeters pressure.

7. Alpha-salicylo-ethyl-n-butyrate, a colorless liquid boiling at a temperature of about 147°–155° C. at 4 millimeters pressure.

ERNEST F. GRETHER.
RUSSELL B. DU VALL.